United States Patent [19]

Federhen et al.

[11] Patent Number: 4,850,751

[45] Date of Patent: Jul. 25, 1989

[54] METHOD AND APPARATUS FOR INTRODUCING BULK MATERIAL INTO A PNEUMATIC CONVEYOR CONDUIT

[75] Inventors: Bernd Federhen, Siegen; Manfred May, Niederfischbach, both of Fed. Rep. of Germany

[73] Assignee: Alb. Klein GmbH & Co. KG, Niederfischbach, Fed. Rep. of Germany

[21] Appl. No.: 125,241

[22] Filed: Nov. 25, 1987

[30] Foreign Application Priority Data

Nov. 29, 1986 [DE] Fed. Rep. of Germany ....... 3640282

[51] Int. Cl.$^4$ ............................................ B65G 53/46
[52] U.S. Cl. ...................................... 406/127; 406/132
[58] Field of Search ................. 406/14, 15, 16, 24–26, 406/29, 32, 120, 124, 1, 127, 131, 132, 133, 139, 145; 137/240, 630, 630.14, 630.15; 222/148, 517, 442, 450

[56] References Cited

U.S. PATENT DOCUMENTS

| 1,802,205 | 4/1931 | Fox et al. ............................ 137/240 |
| 3,185,529 | 5/1965 | Davies et al. ....................... 406/133 |
| 4,674,922 | 6/1987 | Federhen ............................ 406/132 |

FOREIGN PATENT DOCUMENTS 3420616 12/1985 Fed. Rep. of Germany ...... 406/132

*Primary Examiner*—Joseph F. Peters, Jr.
*Assistant Examiner*—Edwin L. Swinehart
*Attorney, Agent, or Firm*—Bachman & LaPointe

[57] ABSTRACT

Apparatus for passing a feed of particulate material into a pneumatic conveyor conduit includes a charging chamber communicating with the material feed and a closure arrangement having a closure cone axially movable between a position of communicating the charging chamber with the material feed and a closure position of closing off the chamber from the feed. The closure cone is formed by the base portion of a hollow operating member extending substantially axially in the direction of flow of the material from the feed into the chamber. The operating member is generally tubular and has at least one opening outside the material flow path into the charging chamber. A closure element within the operating member is movable between first and second positions of closing and opening the opening in the operating member, in dependence on the phase of the conveying operation. When the closure element is in the position of closing the opening in the operating member, movement of the closure element also causes axial movement of the latter to displace the base portion thereof which forms the closure cone between its closed and open positions. When the closure cone is in a closed position and the closure element is in an open position, air can be vented from the chamber upwardly through the operating member and through the opening therein, around the closure element.

16 Claims, 2 Drawing Sheets

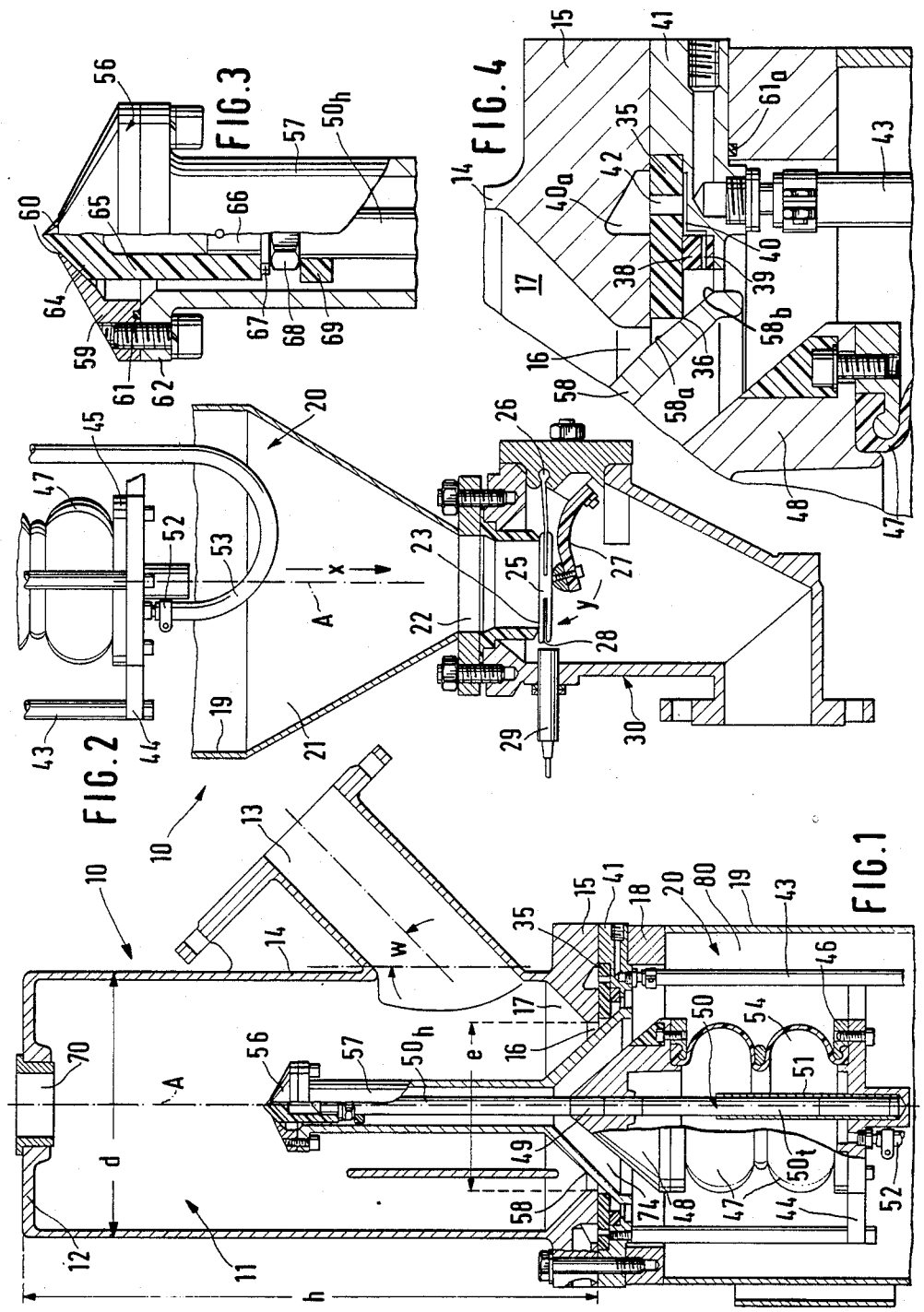

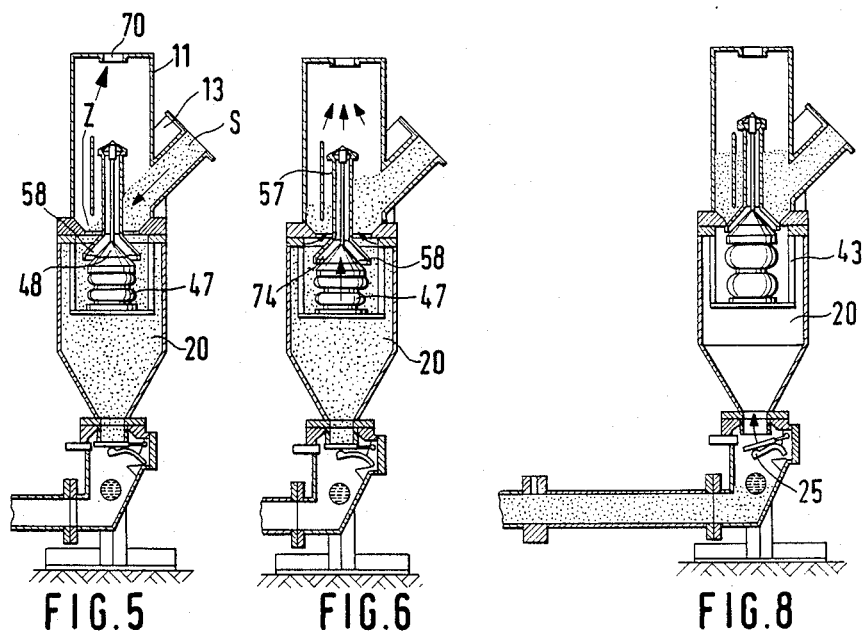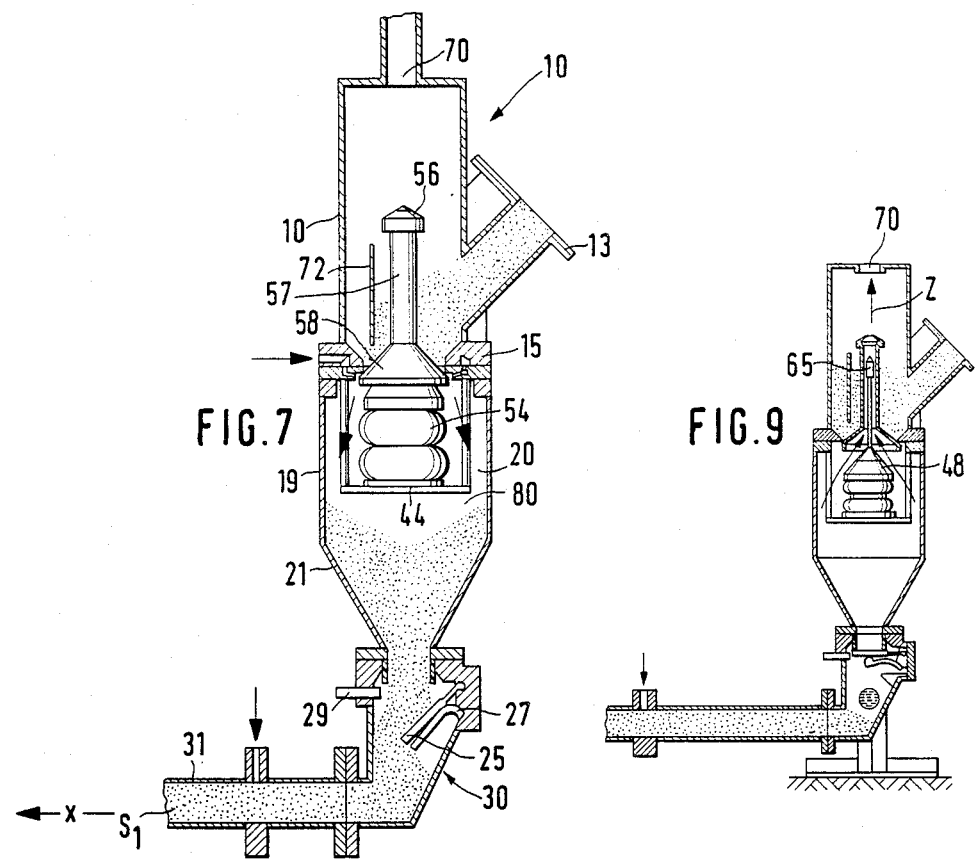

METHOD AND APPARATUS FOR INTRODUCING BULK MATERIAL INTO A PNEUMATIC CONVEYOR CONDUIT

BACKGROUND OF THE INVENTION

The invention relates generally to a method and an apparatus for feeding bulk material into a pneumatic conveyor conduit through which the material is then to be transported.

One form of apparatus for feeding bulk material in particulate or granular form into a pneumatic conveyor conduit, as disclosed in German laid-open application (DE-OS) No. 31 44 592, comprises a charging valve lock chamber through which the bulk material is passed from a storage or accumulation space, for example a conduit of a storage container, into the pneumatic conveyor conduit. The charging chamber can be alternately closed off relative to the storage or accumulation chamber on the one hand by means of a movable closure cone member co-operating with a seat in the form of a sealing edge disposed in opposite relationship thereto, and on the other hand, relative to the conveyor conduit, for example by means of a flap. That apparatus makes it possible to produce an almost continuous delivery flow if a plurality of such apparatuses are successively brought into operation alternately for the conveying operation. A system of that nature is known from what is referred to as tandem installations but it suffers from the disadvantage that it requires a considerable amount of expenditure in terms of operating equipment. As indicated above, the closure member is in the form of a cone member which can be actuated by pneumatic means but it is necessary to associate therewith an upstream-disposed cone-type closure member for controlling the feed flow into a metering chamber for feeding the bulk material through the apparatus, and that in turn involves corresponding apparatus expenditure. In addition however, not only does that apparatus require the upstream closure member but it also has a separate air vent valve, the vent air from which has to be suitably carried away. Furthermore, the air for closing the closure member and for producing the conveying action is introduced through a suitable feed system. The conveying air pressure must correspond to the necessary closing pressure of the closure arrangement, which in this case makes it impossible to arrive at a proper setting in respect of the operational air parameters of the equipment.

In another form of apparatus for feeding bulk material to a pneumatic conveyor conduit, as disclosed in Swiss patent specification No. 340 765, using a sealing edge providing a seat for a closure member for closing off the flow of bulk material through the apparatus, for it to pass into the conveyor conduit, operatively associated with the sealing edge is at least one annular feed passage which feeds air to a series of holes directed on to the head portion of the closure member to provide a curtain or veil of air which sweeps thereover for cleaning purposes. After the closure procedure, that air flows away unused above the closure member and cannot be used in that arrangement as useful conveying air. The supply is arranged at the position of the movable closure member and must therefore also be movable. That arrangement does not make any provision for fluid-tight connection to a storage container or the like.

In another form of apparatus for almost continuous conveying of bulk materials, as disclosed in German laid-open application (DE-OS) No. 34 20 616, the apparatus has only one conveyor container and does not involve any upstream-disposed metering arrangement. The apparatus is suitable for conveyor pressures of around 6 bars and provides for optimum use of the energy which is supplied for pneumatic conveying of the bulk material, while ensuring a substantial degree of operational reliability in all operating conditions and also operating in a substantially wear-free manner. In that arrangement, associated with each sealing edge which forms a seat for a closure cone member is at least one annular air supply passage for producing a flow of air which is directed towards the closure cone member, while a closure flap which is pivotally mounted at one end thereof is urged upwardly by a force storage means, the flap in the closure position thereof bearing against the substantially horizontal edge of a mouth opening of the charging chamber of the apparatus. The sealing edge is provided on a resilient sealing ring and is disposed above a bellows cylinder on which the closure cone member is carried and by which it is moved.

SUMMARY OF THE INVENTION

An object of the present invention is to provide an improved apparatus with a charging lock chamber for feeding a charge of bulk material into a pneumatic conveyor conduit.

Another object of the present invention is to provide an apparatus for charging particles of bulk material into a conveyor conduit, which is of a more effective configuration at the intake side thereof.

Still another object of the present invention is to provide an apparatus for passing a feed of bulk material particles into a pneumatic conveyor conduit, which is adapted to operate at a high level of efficiency and provide a high degree of operational reliability.

A further object of the present invention is to provide an apparatus for transferring a feed of bulk material particles from a supply chamber thereof into a pneumatic conveying conduit, under selective control by closure of a valve means, which is of a more rational construction and which is less susceptible to wear than previous designs.

Still a further object of the invention is to provide an improved method of feeding bulk material into a pneumatic conveyor conduit, which affords a higher level of operational reliability and a reduced risk of air-induced material blow-back.

In accordance with the present invention, these and other objects are achieved by means of an apparatus comprising a charging valve or lock chamber for charging a feed of bulk material in particulate or granular form from a material feed chamber or space into a pneumatic conveyor conduit, wherein the charging chamber is adapted to be closed alternately relative to the feed chamber by means of an axially movable closure cone member co-operating with a sealing edge in opposite relation thereto, on the one hand, and on the other hand relative to the conveyor conduit. The closure cone member is formed by the base portion of a hollow operating member which extends substantially in the direction of conveying movement of the material through the apparatus, upstream of the charging or lock chamber. The hollow operating member has at least one opening which is arranged outside the flow path of the bulk material through the charging chamber. The apparatus further includes a closure element which is adapted to co-operate with the opening in the hollow operating member, the closure element being adapted to be moved towards and away from the opening in the hollow operating member, in dependence on the conveying operation. The closure element can thus close off the opening in the hollow operating member, by the actuation of suitable control means.

In accordance with a preferred feature of the invention, the above-mentioned closure element is carried on the free end of an actuating bar and in its position of closing the opening in the hollow operating member, supports a head portion which is part of said hollow operating member and which has the at least one opening therein. The operating member is in the form of a tube whose interior communicates with and thus forms part of the charging chamber, with the bar being disposed within the tube in the longitudinal direction thereof. That arrangement makes it possible at the end of a conveying operation in which bulk material is fed from the apparatus into the conveyor conduit, to ensure that the charging or lock chamber is easily vented through the remaining portion of bulk material which is in the feed leading to the charging or lock chamber of the apparatus.

The above-mentioned tube forming the hollow operating member is preferably disposed in an ante-chamber or feed chamber disposed upstream of the charging lock chamber. In accordance with a further feature of the invention, in an upward direction the upstream chamber has at least one vent opening and a preferably lateral feed connection for introducing the bulk material into the apparatus.

In accordance with still a further preferred feature of the invention, a cone head portion is operatively associated with the closure cone member, at the side thereof which is towards the charging chamber, and at a spacing therefrom. The cone head portion is fixedly connected to the above-mentioned bar on which the closure element is also disposed. The spacing of the cone head portion relative to the tip of the closure element is greater than the free internal length of the tube so that between the closure cone member and the cone head portion there is always a sufficient gap which communicates with an annular space between the bar and the interior of the tube through which the bar extends. That annular space then terminates at least one opening in the head part of the tube.

In accordance with a further preferred feature of the invention, the bar passes through the cone head portion and is loosely mounted with its free lower end in a guide tube which permits the stroke movement of the bar within the tube, while however preventing deflection thereof. The upward and downward movements of the bar within the tube, and therewith of the closure element, are produced by means of the above-mentioned cone head portion which is connected to a bellows arrangement, for example as disclosed in DE-OS No. 34 20 616, and which is lifted when the bellows arrangement is supplied with an operating fluid such as air. At the same time, the axial bar is moved upwardly and entrains therewith the top part of the tube forming the hollow operating member, and thereby also entraining upwardly the closure cone member to close off the feed of bulk material into the charging chamber. When the bellows arrangement is vented, the closure element can move downwardly and come away from the top part of the tube and then opens the vent opening thereof. As will be described hereinafter, that is possible by virtue of the fact that the closure cone member and the tube forming the hollow operating member are still held in an upper position by the air pressure while the cone head portion is already moving downwardly, together with the bar on which it is supported.

Advantageously, the closure element comprises a hood-like sleeve or bush portion of a material of limited elasticity, which sleeve portion is carried on the upper end of the bar and provides that that part of the charging chamber is sealed off at the opening in the top part of th tube forming the hollow operating member.

The bar is preferably divided into two axial bar portions which are connected together by the cone head portion, preferably being screwed thereinto.

In order to permit reliable venting of the charging chamber through the top part of the operating tube, the latter is disposed in the above-mentioned upstream chamber above the feed connection for the bulk material into the apparatus and below an aperture for venting of that upstream chamber.

With the bulk material being introduced into the apparatus through a lateral feed connection thereon, in order to provide for an improved change in the direction of the flow on the bulk material as it issues from the feed connection into the apparatus, to direct it more efficiently towards the charging chamber, arranged at a spacing from the tube forming the operating member and opposite the mouth opening of the feed connection is a substantially vertical baffle wall which is thus disposed in the upstream chamber which is preferably formed by a tubular wall arrangement.

A further advantageous feature of the invention lies in the arrangement of the sealing ring which provides the seat for the closure cone member. The upstream-disposed chamber, as mentioned above, is defined by a tubular wall arrangement which adjoins the sealing ring, with a feed surface which tapers conically inwardly in the direction of conveying movement of the material towards the charging chamber. At the sealing ring, the tubular wall arrangement has an annular groove for providing a supply of air therethrough. The annular groove communicates with a further annular groove and a suitable air guide passage, which are disposed on the other side of the sealing ring, through apertures provided in the ring. Adjoining the further annular groove which is under the sealing ring are radial air passages, the mouth openings of which are directed towards the closure cone member. That arrangement provides that the region of those air passages or bores is very substantially kept out of the flow of material being conveyed through the apparatus, especially when the mouth openings of the air passages are displaced outwardly in a shoulder-like configuration, in the direction of conveying flow.

The apparatus in accordance with the teachings of the present invention preferably further includes a closure means for closing off the outlet of the charging chamber, thereby to control the flow of material from the charging chamber into the conveyor conduit, in the form of a flap which may be for example as described in greater detail in DE-OS No. 34 20 616. It will be appreciated however that other forms of closure device may also be employed.

In a further aspect of the invention, a method of controlling a charging operation for transferring a feed of bulk material in particulate or granular form from for example a storage container into a pneumatic conveyor conduit under conveying pressure through a charging or lock chamber in an apparatus in accordance with the present invention provides the charging chamber is vented through the flow of bulk material, in opposition to the conveying direction thereof.

Thus, when employing that method in relation to an apparatus in accordance with the invention which has a closure device in the from of the above-mentioned flap for closing off the charging chamber relative to the conveyor conduit, for the purposes of filling the charging chamber, it is closed in a downward direction by the flap which is acted upon by a closing spring. The closure cone member is disposed at a spacing from its seat formed by the sealing edge, the opening in the top part of the hollow operating member which is of a tubular configuration is closed as the latter is resting on the closure element mounted on its support bar.

After the expiry of an adjustable filling time or in response to a signal indicating a given level of filling of the chamber, blowing air is directed on to the closure cone member through the annular groove arrangement referred to hereinbefore at the sealing ring, and at the same time the cone head portion is lifted by the bellows arrangement. The cone head portion and therewith its support bar entrain the top part of the tube forming the hollow operating member upwardly and therewith also the closure cone member which comes into contact against the sealing edge. Air which continues to flow out of the radial air passages from the above-mentioned annular grooves then builds up the necessary conveying pressure in the pressure space in the charging or lock chamber, until the pressure produced corresponds to that in the conveyor conduit. As a result the discharge flap opens and the bulk material flows into the conduit.

The flap can then closed again when it is free of bulk material, that is to say, the level of the material in the apparatus has fallen below the level of the path of movement of the flap between the open and closed positions thereof. When the lower mouth opening of the pressure space has been closed again by the flap, the injection of air through the various air passages is interrupted, the bellows arrangement is vented and the cone head portion is moved downwardly.

In that situation, the closure cone member is held against its sealing edge by the air pressure which still obtains in the pressure space in the apparatus, until the increased pressure has fallen again. It is only then that the closure cone member moves downwardly under its own weight until the top part of the tube forming the hollow operating member again rests on the closure element carried on its support bar. The spacing between the inside surface of the closure cone member and the outside surface of the cone head portion has admittedly been reduced in that case, but is still present to preserve the above-mentioned gap.

Further objects, features and advantages of the present invention will be apparent from the following description of a preferred embodiment.

BRIEF DESCRIPTION OF THE DRAWINGS

FIG. 1 is a view in longitudinal section through a part of the apparatus according to the invention, FIG.. 2 shows a further part of the apparatus according to the invention, which extends the FIG.. 1 structure downwardly in the axial direction thereof, FIG. 3 shows the tip portion on the axial tube of the FIG. 1 arrangement on an enlarged scale, FIG. 4 shows the arrangement of the sealing ring and of the introduction of air at the closure cone member on a still further enlarged scale relative to FIG. 1, and FIGS. 5 through 9 show diagrammatic sectional views through the apparatus in different operating conditions thereof..

DESCRIPTION OF THE PREFERRED EMBODIMENT

Referring firstly to FIGS. 1 and 2, shown therein in two parts in FIG. 1 and FIG. 2 respectively for the sake of simplicity of the drawing is an apparatus 10 for conveying and charging bulk material S in dust-like or granular form. The apparatus 10 comprises an upper tubular body 11 of a diameter indicated at d which in this embodiment is about 240 mm and of a height indicated at h of about 500 mm, with an end plate portion 12 formed thereon, and a lateral flanged tube connection 13 which defines an angle indicated at w of about 45° with the tubular wall arrangement 14 of the tubular body 11.

Disposed at the bottom part of the tubular body 11 is a radially projecting flanged ring 15 providing an opening 16 which, by virtue of a conically tapering feed surface 17, is of a diameter as indicated at e of for example 150 mm, which is less than the transverse dimension of the tubular wall arrangement 14. Extending coaxially with the longitudinal axis A of the apparatus, below the ring 15, is an also tubular container wall arrangement 19 defining a charging valve or lock container 20 which, as shown in FIG. 2, goes into a discharge cone portion 21. The cone portion 21 terminates downwardly in a discharge connection 22 with an annular horizontal mouth opening edge indicated at 23.

A discharge closure member illustrated in the form of a flap 25 is disposed downstream of the discharge connection 22 as considered in the direction of conveying movement of the material, as shown by the arrow x in FIG. 2. The flap 25 is mounted pivotably at its side at 26 and in the closure position shown in FIG. 1 is urged by a closing spring 27 against the mouth opening edge 23 which thus acts as a sealing seat therefore, when the pressure in the charging container 20 is lower than the conveying pressure in a conveyor conduit 31 laterally connected to a discharge housing 30. The conveyor conduit 31 is specifically identified by reference numeral 31 in FIG. 7. During a pivotal movement of the discharge flap 25 in the closure direction (as indicated by the arrow y in FIG. 2), the discharge flap 25, by means of a terminal member or portion 28, actuates a switch 29 which can be triggered in a contact-less mode and which is inductive, capacitive, magnetic or optical in its operation, to produce a vent operation which will be described hereinafter.

Disposed between the flange ring 15 and a holding plate 18 on the wall arrangement 19 of the charging container 20 is a sealing ring 35 of limited elasticity, having a sealing edge as indicated at 36 in FIG. 4. Disposed below the sealing ring 35 in the conveying direction x is a feed ring 38 which can be most clearly seen from FIG. 4 and which has through bores 39 communicating with an upwardly open annular groove 40 provided in an intermediate ring 41. Disposed below the intermediate ring 41 are mounting rods indicated at 43 in each of FIGS. 1, 2 and 4, for carrying a base plate 44 in FIG. 1 in such a way that the spacing thereof relative to the discharge cone portion 21 approximately corresponds to the width of the annular opening 16.

Fixedly carried on the base plate 44 is a bottom plate member 45 to which the lower edge of a bellows arrangement 47 is connected by means of a clamping ring 46. The upper edge of the bellows arrangement 47 is fitted into a cone head portion 48 (see FIG. 4). Two parts of a support bar 50 terminate in the cone head portion 48, each being screwed thereinto as indicated at 49 in FIG. 1. The free end of the lower bar portion, as indicated 50, in FIG. 1, is axially displaceably mounted in a guide tube 51 which is clamped endwards into the base plate 44, more particularly beside a connecting sleeve 52 for the connection of an air hose 53 for supplying air to and venting the interior 54 of the bellows arrangement 47.

The upper portion $50_h$ of the bar 50 extends as far as a hat-like conical tip portion 56 on an axial tube 57 which in a downward direction becomes a closure cone member 58 which increases in transverse dimension in a downward direction. In the position shown in FIGS. 1 and 4, the outside surface indicated at $58_a$ in FIG. 4 of the closure cone member 58 bears against the above-described sealing edge 36 on the sealing ring 35 while its lower edge as indicated at $58_b$ is disposed approximately at the lower edge of the intermediate ring 41.

The tip portion 56 on the axial tube 57 is formed by a roof-like ring 59 of approximately L-shaped cross-section, with a central opening 60 therein. The ring 59 is screwed to a flange 62 on the axial tube 57, with the interposition of a sealing ring 61, and rests on the conical tip portion 64 of an extension portion 65 of the axial bar 50, see FIG. 3. The extension portion 65 is of generally U-shaped crosssection, as can be seen for example from FIGS. 1 and 3 which each show half thereof. The extension portion 65 is made from material of limited elasticity and is pushed on to the end 66 of the bar 50 until it bears against an abutment disc 67. Disposed below the latter are a nut 68 and a resilient guide ring 69 which can be clearly seen in FIG. 3.

It will be appreciated therefore that the portion 64, 65 forms a closure element which is capable of co-operating with the ring 59 to close the at least one opening 60 therein.

Reference will now be made to FIGS. 5 through 9 to describe the mode of operation of the above-described apparatus and the method of feeding bulk material in particulate or granular form into a pneumatic conveyor conduit.

Referring firstly therefore to FIG. 5, during a filling operation the bulk material S is passed through the lateral flanged tube connection 13 into the tubular body 11 from which it passes into the charging chamber or container 20. In that situation, the closure cone member 58 is disposed at a spacing relative to the sealing edge 36, with the bellows arrangement 47 being substantially vented. During the filling operation, the discharge flap 25 in the discharge housing 30 is pressed against the edge 23 of the mouth opening of the discharge connection 22 by the closing spring 27 and the air pressure obtaining in the conveyor conduit 31.

The air which is displaced during the filling operation can escape from the tubular body 11 through the central aperture 70 in the end plate portion 12, as indicated by the arrow Z in FIG. 5.

After expiry of the filling time which can be set for example on a timing relay, the charging container 20 is filled and air is introduced into the bellows arrangement 47. At the same time, as shown in FIG. 6, blowing air flows through the bores 39 in the ring 38 and on to the closure cone member 58. The blowing air is passed to the bores 39 by way of the above-described annular groove 40 of the intermediate ring 4, apertures 42 is the sealing ring 35 and the further annular groove $40_a$ in the flanged ring 15, which can be clearly seen in its cross-sectional shape in FIG. 4. The closure cone member 58 which has been blown free of material by the blowing air directed thereonto is lifted by the bellows arrangement or cylinder 47 and now seals off the pressure space 80 in the charging chamber 20 relative to the tubular body 11, see FIG. 7.

The air which continues to flow into the apparatus builds up the conveying pressure in the charging container 20. When the pressure in the container 20 is as high as that in the conveyor conduit 31, the discharge flap 25 opens for the bulk material to flow from the container 21 into the conveyor conduit.

Thus, the bulk material which leaves the container 20 is urged into the conveyor conduit 31 in which it flows in the direction indicated by the arrow x, as indicated at $S_1$, while the bulk material which has been introduced into the apparatus and which is supported on the closed closure cone member 58 bears in part against a vertical wall or baffle member 72 disposed at a spacing from and parallel to the axial tube 57 in the tubular body 11, as clearly visible in FIG. 7.

When the level of bulk material falls below the discharge flap 25, it is lifted into its closure position of bearing against the edge 23 of the mouth opening, by the closing spring 27, see FIG. 8. The air which flows on out of the container 20 cleans the surface of the flap. When the flap 25 actuates the switch 29, the feed of air is interrupted by valves (not shown) controlled by the switch 29, the bellows arrangement 47 is vented and the cone head portion 48 moves downwardly. The closure cone member 58 is held against the sealing ring 35 or feed ring 38 by the air pressure still obtaining in the container 20, until that increased pressure has fallen.

FIG. 9 shows the path through which the air is vented from the described arrangement: the air flows out of the pressure space 80 in the container 20 upwardly into an annular gap which is always present, being defined by the cone head portion 48 and the closure cone member 58, as indicated by reference numeral 74 in FIG. 6 and FIG. 1. When the bellows arrangement 47 is vented, the cone head portion 48 moves downwardly and downwardly entrains the bar 50 and the extension portion 65 thereof. When that happens, the central opening 60 in the ring 59 is opened by the movement of the extension portion 65 which thus acts as a closure element, and that permits the air to escape upwardly to the aperture 70 in the end plate portion 12.

When the venting operation is terminated, the closure cone member 58 drops downwardly under its own weight and the closure element i.e., the extension portion 65 again moves into a position of closing the central opening 60. The filling operation can then begin again.

It will be appreciated that the above-described apparatus and method of the present invention have been set forth solely by way of example and illustration thereof and that various other modifications and alterations may be made therein without thereby departing from the spirit and scope of the invention.

What is claimed is:

1. In an apparatus for feeding bulk material from a material feed into a pneumatic conveyor conduit, comprising a charging chamber having an entrance for the material and having a longitudinal axis, at said entrance of the charging chamber a seat defined by a sealing edge portion, an axially movable closure cone member movable between an open position in which it is spaced from said seat and material from said material feed can flow through said spacing into said charging chamber and a closed position in which the closure cone member co-operates with said seat to prevent said flow, and means for closing said charging chamber relative to the conveyor conduit, the improvement that the closure cone member comprises a base portion of a hollow operating member which extends substantially axially in the conveying direction upstream of the charging chamber, the hollow operating member having at least one opening which is arranged outside the flow path of the material to said charging chamber, and further including a closure element which is arranged movably towards and away from said at least one opening in dependence on the conveying operation, the cross-section of said at least one opening being disposed in the path of movement of said closure member.

2. Apparatus as set forth in claim 1 including a support bar having an end portion on which said closure element is carried, and wherein said hollow operating member is substantially tubular with its interior communicating with said charging chamber and carries a head portion having said at least one opening, said closure element in its closed position supporting said head portion.

3. Apparatus as set forth in claim 2 and further including a cone head portion operatively associated with the closure cone member at the side thereof towards the charging chamber at a spacing therefrom, said cone head portion being fixedly connected to the support bar.

4. Apparatus as set forth in claim 3 wherein said closure element has a tip and wherein said tubular operating member has a free internal length, wherein the spacing of the cone head portion relative to the tip of the closure element is greater than the free internal length of the tubular operating member.

5. Apparatus as set forth in claim 3 wherein the support bar passes through the cone head portion and has a lower free end portion, and further including a guide means for freely movably guiding said lower free end portion of said support bar.

6. Apparatus as set forth in claim 3 and further including a stroke-producing actuating means on which said cone head portion is mounted, in the form of a bellows means which is axially variable in length, and a compressed air conduit means connected to the bellows means for operation thereof.

7. Apparatus as set forth in claim 2 wherein said tubular operating member has a head portion in the form of a roof-shaped dish-like ring enlarges in a downward direction and which defines said opening at a central location therein.

8. Apparatus as set forth in claim 2 wherein said closure element on said support bar includes a sleeve of a material of limited elasticity, having an upwardly conically tapering tip portion.

9. Apparatus as set forth in claim 3 wherein said support bar comprises first and second bar portions connected together at said cone head portion.

10. Apparatus as set forth in claim 2 wherein said tubular operating member extends in an upstream chamber adjacent said charging chamber, said upstream chamber having a feed means for introducing the bulk material thereinto beneath the top of said tubular operating member, the upstream chamber having at least one aperture above he top of said tubular operating member.

11. Apparatus as set forth in claim 10 and including at a spacing from said tubular operating member at the side of the upstream chamber which is remote from said feed means, a baffle means disposed at a spacing from the surface of the closure cone member.

12. Apparatus as set forth in claim 10 wherein said upstream chamber is delimited by a tubular wall means providing a feed flow surface which tapers inwardly in the direction of conveying movement of the material in the apparatus, and including adjoining said feed flow surface a sealing ring providing said sealing edge, wherein at said sealing ring the tubular wall means has air flow passage means for carrying a flow of air therethrough.

13. Apparatus as set forth in claim 12 and further including in opposite relationship to said passage means at the sealing ring at least one further air flow passage means and substantially radially extending air duct means communicating with said at least one passage means and being directed towards the closure cone.

14. Apparatus as set forth in claim 13 wherein said passage means and said further passage means each comprise an annular groove.

15. Apparatus as set forth in claim 13 wherein said air duct means are provided in a feed ring and the inside surface of said feed ring is displaced outwardly at a radial spacing relative to said sealing edge portion.

16. Apparatus for feeding particulate material into a pneumatic conveyor conduit comprising: a housing structure providing a feed chamber having a material feed connection for a feed of said material into said feed chamber, a charging lock chamber disposed below said feed chamber and opening means adapted to provide a communication for a flow of said material from said feed chamber into said charging lock chamber; an elongate support member extending from said charging lock chamber through said opening means into said feed chamber and comprising a lower end portion and an upper end portion; actuating means operatively connected to said lower end portion of said support member for producing displacement thereof at least substantially in the longitudinal direction thereof; a closure element carried on said upper end portion of said support member; a substantially tubular operating member extending through said opening means and into said feed chamber to a level therein higher than said feed connection and comprising a generally cone-shaped closure portion adapted to co-operate with said opening means for closing same to prevent a flow of said material through said opening means, and an elongate shank portion extending from said generally cone-shaped closure portion into said feed chamber, said shank portion enclosing said upper end portion of said support member and having a vent opening at its end remote from said generally cone-shaped closure portion, the arrangement of said vent opening and said closure element being such that is a raised position of said closure element it closes said vent opening in said shank portion and displaces said hollow operating member upwardly to cause said generally cone-shaped portion to close said opening means; and discharge closure means adapted selectively to close the discharge from said charging lock chamber into said pneumatic conveyor conduit.

* * * * *

UNITED STATES PATENT AND TRADEMARK OFFICE
CERTIFICATE OF CORRECTION

PATENT NO. : 4,850,751
DATED : July 25, 1989
INVENTOR(S) : BERND FEDERHEN ET AL.

It is certified that error appears in the above-identified patent and that said Letters Patent is hereby corrected as shown below:

Column 9, claim 7, line 54, after "ring" --which-- should be inserted.

Column 10, claim 10, line 2, "he" should read --the--.

Column 10, claim 16, line 60, "is" should read --in--.

Column 10, claim 16, line 63, after "cone-shaped" --closure-- should be inserted.

Signed and Sealed this

Thirty-first Day of July, 1990

Attest:

HARRY F. MANBECK, JR.

Attesting Officer

Commissioner of Patents and Trademarks